UNITED STATES PATENT OFFICE.

GEORGE P. COLE, OF JOHNSTOWN, ASSIGNOR OF TWO-THIRDS HIS RIGHT TO MICHAEL D. MURRAY, OF SAME PLACE, AND JOHN P. SWARTWOUT, OF OPPENHEIM, NEW YORK.

IMPROVEMENT IN COMPOSITIONS FOR COLORING BRICKS, &c.

Specification forming part of Letters Patent No. 214,106, dated April 8, 1879; application filed November 23, 1878.

*To all whom it may concern:*

Be it known that I, GEORGE P. COLE, of Johnstown, in the county of Fulton and State of New York, have invented a new and valuable Improvement in Compositions for Coloring Brick, Stone, &c.; and I do hereby declare that the following is a full, clear, and exact description of the said compound.

My invention consists in a compound for coloring stone, brick, wood, or the like.

In carrying out my invention I employ the following ingredients, in proper proportions to form a liquid—*i. e.*, to make three pints of the composition, put four ounces of malt to soak in one quart of water. Subject it to 160° of heat, and let it stand for two hours. Take two ounces of hops and dampen with the water from the malt. Place them in a bag, and then place the bag in the malt liquor to soak out the strength of the hops. Then take one-half ounce of horse-chestnuts and two drams of alum, place in the malt liquor, steep for two hours, drain off, and put this liquor with the other ingredients. Two grains of cocculus Indicus, one-fourth ounce of salt, and one ounce of sumac should then be placed in a gill of rain-water and boiled. It should then stand for six hours, be strained off, and mixed with the other ingredients in the malt liquor. One-half ounce of Venetian red, or other suitable coloring matter, should then be added. After this four ounces of sour beer and one-fourth ounce of plug-tobacco should be put to soak for ten hours, strained, and then mixed with the other ingredients in the malt liquor.

This composition should be permitted to stand from six to eight weeks. The impurities rising to the surface during this time should be skimmed off. The composition should be frequently stirred before and while using, and may be applied with an ordinary brush.

I have discovered that this composition for this purpose will not be destroyed by heat or water, and that weather will not fade it. Being void of any oily substance, it does not destroy, or decompose, or disintegrate the article upon which it is placed.

What I claim as new, and desire to secure by Letters Patent, is—

As a coloring composition for stone, bricks, and the like, a liquid formed of solutions of malt, hops, salt, horse-chestnuts, sumac, alum, sour beer, cocculus Indicus, and plug-tobacco, combined with Venetian red or other desired coloring-matter, as set forth.

In testimony that I claim the above I have hereunto subscribed my name in the presence of two witnesses.

GEORGE P. COLE.

Witnesses:
HARWOOD DUDLEY,
WALTER WELLS.